LE GRAND SKINNER.

STEAM ENGINE VALVE MECHANISM.

APPLICATION FILED APR. 25, 1914.

Reissued July 7, 1914.

13,768.

2 SHEETS—SHEET 1.

Witnesses

C. M. Walker

Jas. Rogers.

Inventor

Le Grand Skinner by John A. Bonnerhardt

Attorney

LE GRAND SKINNER.

STEAM ENGINE VALVE MECHANISM.

APPLICATION FILED APR. 25, 1914.

Reissued July 7, 1914.

13,768.

2 SHEETS—SHEET 2.

Witnesses

C. M. Waesche

M. Rogers.

Inventor

LeGrand Skinner

By John A. Brumbaugh

Attorney

UNITED STATES PATENT OFFICE.

LE GRAND SKINNER, OF ERIE, PENNSYLVANIA.

STEAM-ENGINE VALVE MECHANISM.

13,768. Specification of Reissued Letters Patent. Reissued July 7, 1914.

Original No. 1,033,204, dated July 23, 1912. Serial No. 661,632. Application for reissue filed April 25, 1914. Serial No. 834,431.

*To all whom it may concern:*

Be it known that I, LE GRAND SKINNER, a citizen of the United States, residing at Erie, in the county of Erie and State of Pennsylvania, have invented certain new and useful Improvements in Steam-Engine Valve Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to steam engine valves and valve-seats therefor and especially to that type of engine valves known as double-seat puppet valves.

Figure 1:
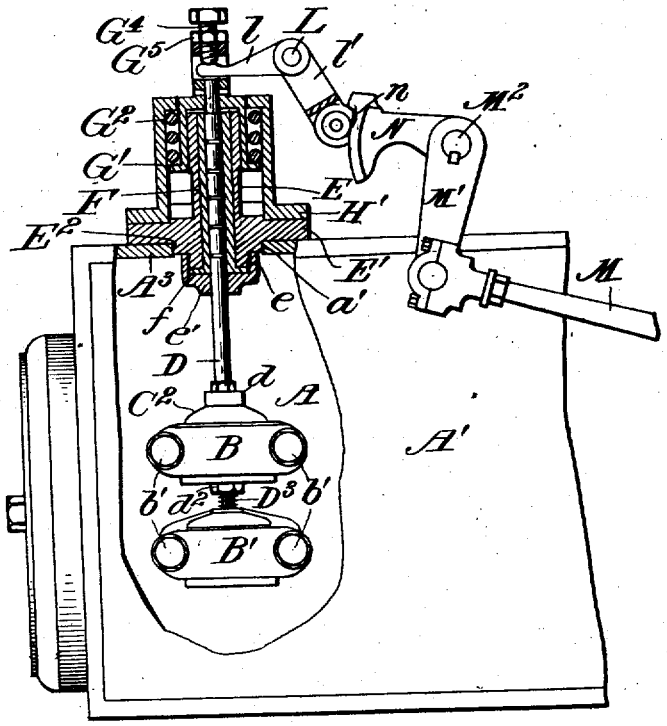
Figure 2:
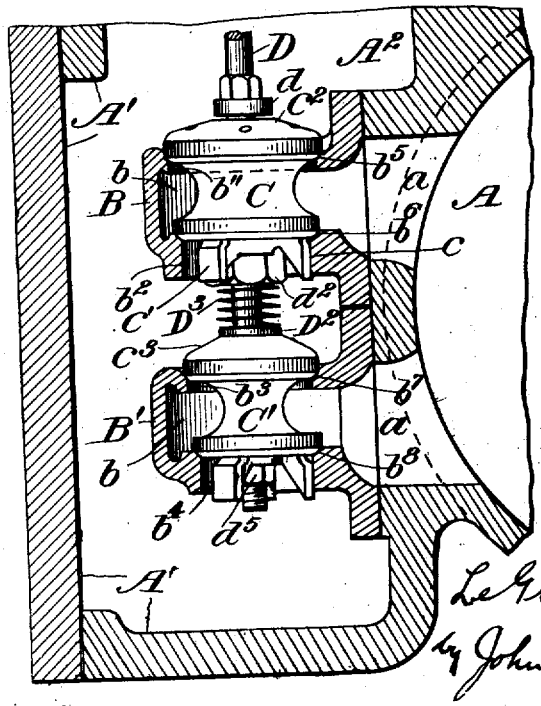
Figure 3:
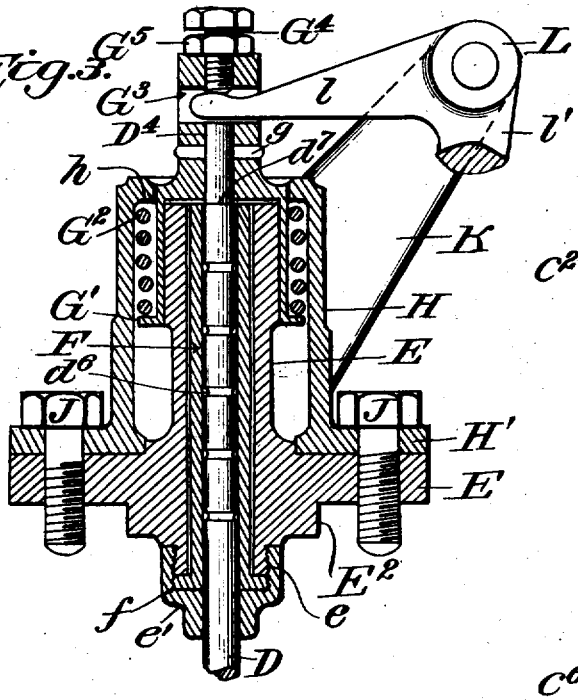
Figure 4:
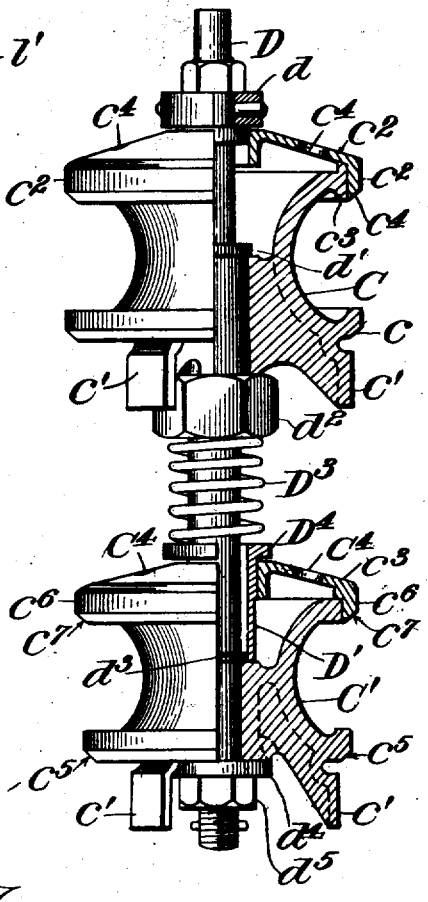
Figure 6:
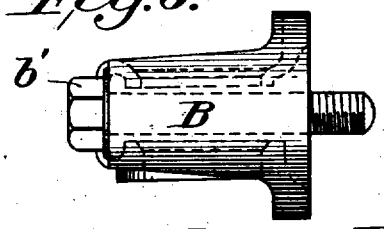
Figure 5:
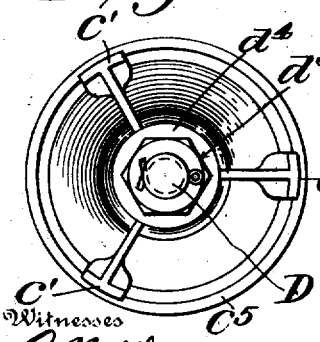
Figure 7:
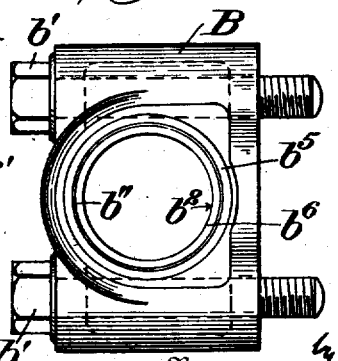

The features of this invention are hereinafter set forth and described and illustrated in the accompanying drawings in which:

Figure 1 is a side view in elevation of a fragment of a steam engine cylinder with a portion of the steam-chest wall broken away. Fig. 2 is a transverse section of the lower portion of the same on enlarged scale, showing the valves and valve-seats in elevation and section. Fig. 3 is a vertical central section of the housing for the upper end of the valve-stem. Fig. 4 is an enlarged view partially in elevation and partially in section of my improved puppet valves, removed from their valve-seats. Fig. 5 is a plan view of the bottom end thereof. Fig. 6 is an edgewise view of one of the valve-seats removed from the engine cylinder. Fig. 7 is a top or plan view thereof.

In these drawings A indicates a steam engine cylinder, and A′ indicates the outside shell which forms the steam chest $A^2$ and exhaust chamber of the engine; *a a* ports in the walls of the cylinder A, through which steam may enter the cylinder from the steam-chest $A^2$ or through which steam may exhaust from the cylinder A on the exhaust side of the engine. Upon the side of the cylinder A and projecting laterally therefrom are hollow valve casings B B′, (see Figs. 2, 6 and 7), the cavities *b* in which coincide with and open into the ports *a* of the cylinder A. These hollow casings B and B′ are secured to the cylinder A by means of bolts *b′* so that they can be removed and replaced when desired by removing the bolts *b′*, the meeting surfaces between the casings B and B′ and the cylinder A being so prepared as to form steam-tight joints therebetween when said parts are secured firmly together, as shown in Fig. 2. Vertically through the walls of these hollow casings B and B′, I make circular openings, the one $b''$ through the upper wall of the casing B, being larger than the opening $b^2$ through the lower wall thereof; and the opening $b^3$ through the upper wall of the casing B′ being larger than the opening $b^4$ in the lower wall thereof, the largest opening $b^3$ in the casing B′ being smaller than the smallest opening $b^2$ in the casing B, as and for the purpose hereinafter set forth. The upper annular corners of each of these openings $b''$, $b^2$, $b^3$, $b^4$, is beveled or countersunk for the purpose of forming annular valve-seats $b^5$, $b^6$, $b^7$, and $b^8$, thereon.

It is a well known fact among steam engineers that owing to variations in temperature it has been difficult, if not impossible, to construct a double-seated valve which will always be steam-tight under all variations of temperature, as valves of this character have heretofore been made. It is therefore an object of the present invention to construct a double-seated valve in which there is provided a compensation for the expansion and contraction of the metal parts; and also to compensate for such contraction and expansion when a plurality of such valves are mounted in tandem upon a single valve-stem. In order to overcome these difficulties, in this improved form of double-seated valve, there is provided a valve-body C having an annular valve surface *c* around the lower end thereof which, in conjunction with the annular valve-seat $b^6$ in the casing B, is adapted to form a steam-tight joint therewith, the intermediate portion of said valve body C being of reduced diameter to permit of the free passage of steam thereabout when the valve is raised.

Projecting from the lower end of the valve-body C, are three guides *c′ c′ c′* adapted to contact with the inside surface of the opening $b^2$ in the casing B for the purpose of accurately guiding the valve-body C to its seat upon the valve-seat $b^6$. The upper end $c^3$ of the valve-body C is preferably of greater diameter than the valve-seat *c* at the lower end of said valve-body, so that the steam resting thereupon will overbalance the upward thrust of the steam against the lower end of the valve-body within the opening $b^2$ in the lower wall of the valve-casing B, and thereby prevent the raising of the valve-surface $c^5$ off of its seat $b^6$, by reason of the upward thrust of the steam on the bottom of the valve-body C.

The valve-body C is rigidly secured on a valve-stem D, preferably by means of an annular shoulder $d'$ on the valve-stem D contacting with the upper end, and a screw-nut $d^2$ on the valve-stem D below said valve-body C which is screwed up and tightly engages the lower end of the hub of the valve-body C thereby preventing any movement of the valve-body upon the valve-stem D. Upon the valve-stem D above said valve-body C there is placed a valve-cover $C^2$ which has a depending annular valve-ring $c^2$ which overlaps the annular upper edge $c^3$ of the valve-body C. The outer annular corner of the flange $c^2$ is beveled off to form a valve-surface $c^4$, which is adapted to fit down upon the upper valve-seat $b^5$ on the hollow casing B, and form a steam-tight joint in conjunction therewith. Upon the valve-stem D above the valve-cover $C^2$, there is a collar $d$ secured against longitudinal movement thereon so that a narrow space remains between said collar $d$ and the top of the valve-cover $C^2$, so that when the valve-surface $c^4$ on the valve-cover $C^2$ contacts with its valve-seat $b^5$ on the upper side of the casing B, the valve-stem D and valve-body C thereon may continue to move downward until the annular valve-surface $c$ on the lower end of the valve-body C closes down upon its valve-seat $b^6$ on the upper annular edge of the lower opening $b^2$ in the casing B. The valve-cover $C^2$ is provided with openings $C^4$ therethrough which permits steam within the steam-chest $A^2$ to press upon the upper end of the valve-body C independently of the valve-ring or cover $C^2$. It will therefore be seen that variations in the measurement between the upper valve-seat $b^5$ and the lower valve-seat $b^6$ and between the lower valve-seat $b^6$ in the casing B, and the lower valve-seat $b^8$ in the casing B′, and between their relative valve-surfaces, $c$ and $c^4$ and $c^5$ and $c^7$ is compensated for by the slight movement provided for of the valve-stem through the valve cover $C^2$, and through the valve C′ and the valve-cover $C^3$, and the pressure of the steam upon the several parts of said valves will be sufficient to hold the several valve-surfaces securely down upon their respective seats.

In the drawings are shown two double-seated valves C and C′ mounted in tandem upon a single valve-stem. In this case the valve-stem D is extended downward below the valve-body C thereon, and upon the lower end thereof is slidably mounted a valve-body C′ which is of the same form as the upper valve-body C, but of enough smaller diameter so that the annular valve-surface $c^5$ thereon will seat upon the lower valve-seat $b^8$ in the lower hollow casing B′. Like the upper valve-body C the lower valve-body C′ is provided with guides $c'$, which contact with the walls of the circular opening $b^4$ thereby to guide the valve-body C′ so that the annular valve-surface $c^5$ thereon will seat down upon the valve-seat $b^8$ with exactness. To limit the downward movement of the valve-stem D through the lower valve-body C′ there is provided an annular shoulder $d^3$ on the valve-stem D, and on the valve-stem D under the valve-body C′ there is a washer $d^4$ and nut $d^5$, so secured thereon that the dimension between the washer $d^4$, and the annular shoulder $d^3$ is slightly greater than the longitudinal dimension of the hub of the valve-body C′. Upon the top of the valve-body C′ I place a valve-cover $C^3$, which, like the valve-cover $C^2$, is provided with a depending annular flange or valve-ring $c^6$, adapted to fit over the upper end of the valve-body C′, said valve-ring being provided with an annular valve-surface $c^7$ adapted to fit down upon the valve seat $b^7$, in the hollow casing B′. The cover $C^3$ is also provided with a central circular opening therethrough in which a sleeve D′ surrounding the valve-stem D and of sufficient internal diameter to pass over, freely, the annular shoulder $d^3$, with a sliding fit and contact with the upper end of the hub of the valve-body C′. The valve-cover $C^3$, like the upper valve-cover $C^2$, is provided with openings $C^4$, and for the same purpose. Around the upper end of the sleeve D′ there is a radial collar or flange $D^2$, the lower surface of which is slightly raised above the upper surface of the valve-cover $C^3$ when the lower end of the sleeve D′ is down upon the upper end of the hub of the valve-body C′ which permits the cover $C^3$ to have a slight longitudinal movement on the sleeve D′ so as to lift slightly off of the upper end of the valve-body C′. Between the nut $d^2$ on the valve stem D, and the flange $D^2$ on the upper end of the sleeve D′, I place a spiral spring $D^3$, which operates to normally retain the valve-body C′ firmly down upon the washer $d^4$, which position, it is apparent is its greatest downward extension from the upper valve-body C, upon the valve stem D, and yet permits the valve stem D, to slide slightly downward through the valve body C′, should the lower valve-seat $b^8$ in the hollow casing B′ before the lower valve-surface $c$ on the upper valve-body C contacts with the lower valve-seat $b^6$ in the hollow valve casing B. It will therefore be seen that in this improved valve mechanism there is provided compensatory mechanism not only between the two seats of each double-seated valve, but also between the upper and lower double seated valves, so that each seat of each double-seated valve upon the valve-stem D, will at all times seat upon its respective valve-seat in the hollow valve casings, B and B′.

The upper wall $A^3$ of the steam chamber $A^2$ is provided with a circular opening $a'$ of sufficient diameter to permit the insertion and withdrawal therethrough of the valves C and C′, which opening is closed by means of a housing comprising a vertical tube E having a radial flange E′ with a cylindrical shoulder $E^2$ on the under side thereof adapted to fit into the circular opening $a'$ in the wall of the steam chamber $A^2$. Within this tube E, there is a tube F at the lower end of which is provided a radial flange $f$, which fits against the lower end of a screw-threaded nipple $e$ on the lower side of the flange E with a ground steam-tight joint, and upon the screw-threaded nipple $e$ I place a cap $e'$ which has a central opening which coincides with the longitudinal opening in the sleeve F, and operates to retain the sleeve F in the tube E, and the flange $f$ thereon firmly up against the end of the nipple $e$. The valve-stem D extends from the valve C—C′ upward through the cap $e'$ and sleeve F and projects a short distance out of the upper end thereof, and fits the interior of the sleeve F with a steam-tight sliding fit. The valve-stem D is also provided with peripheral grooves $d^6$ where it passes through the sleeve F, which grooves collect water and other lubricants, and aid in excluding the passage of steam between the valve-stem D and the sleeve F.

Adjacent to the upper end of the sleeve F the valve-stem D is reduced in diameter as at $D^4$, thereby leaving an annular shoulder $d^7$ thereon, and upon this reduced upper end $D^4$ of the valve-stem D there is a cap G which contacts with the annular shoulder $d^7$ and which is preferably secured thereon by means of a key $g$; the lower end of this cap is of sufficient interior diameter to be passed down over the upper end of the tube E. The lower end of the cap G is provided with a radial flange G′ upon which I place a spiral spring $G^2$. This cap G extends upward above the end $D^4$ of the valve-stem and is provided with a transverse opening or slot $G^3$, and in the upper end of said cap extending into the slot $G^3$ there is an adjusting screw $G^4$ which is provided with a lock-nut $G^5$ for the purpose hereinafter set forth.

Surrounding the structure above described I place a vertical cylindriform case H, which has an internal annular flange $h$ around the upper end thereof which bears down upon the spring $G^2$, and an outturned radial flange H′ around the lower end thereof by which said case may be secured down upon the flange E by means of the bolts J which pass therethrough and into the top wall $A^3$ of the steam-chamber $A^2$. Projecting from the side walls of the cylindriform casing H are arms K, to which are pivoted levers L for operating the valve mechanism heretofore described. The end $l$ of this lever extends into the slot $G^3$ in the cap G on the upper end of the valve-stem D wherein it engages the lower end of the adjusting screw G. It will be observed that the spring $G^2$ within the case H will act to force the valve-stem D downward to close the valves C and C′ upon the respective valve-seats, and that to operate successfully the spring $G^2$ must be of greater strength than the spring $D^3$ on the valve-stem D between the valves C and C′.

For operating the lever L there is provided a valve gear similar to that shown, described and claimed in application Serial No. 652,087 filed September 30, 1911, which consists of an eccentric-rod M, crank M′, rock-shaft $M^2$ and rock-lever cam N which engages the end $l'$ of the lever L, which, when the curved cam surface $n$ engages the end $l'$ of the lever L causes the arm $l'$ to rise upward on the cap G and the valve-stem D thereby compressing the spring $G^2$ and raising the valves C and C′ thereby permitting steam to enter into the ports $a$ $a$ of the cylinder A, through the circular openings $b''$ and $b^2$ in the hollow valve casing B, and $b^3$ and $b^4$ in the hollow valve casing B′.

From the foregoing the construction and operation of these improved engine valves is so obvious that further description thereof is deemed unnecessary.

Therefore having fully shown and described this invention so as to enable others to construct and utilize the same what I claim as new and desire to secure by Letters Patent is:—

1. In a double-seat engine valve a valve-body, an annular valve surface around the lower end thereof, and a valve-ring telescopically mounted on the upper end of said valve-body, substantially as and for the purpose set forth.

2. In a double-seat engine valve a valve-body, an annular valve surface around the lower end thereof, a valve-ring telescopically mounted on the upper end of said valve-body, a valve-stem rigidly secured in said valve-body, and means on said valve-stem to limit the movement of said telescopic valve-ring, substantially as and for the purpose set forth.

3. In a valve for steam engines, the combination of a valve-stem, a valve body, rigidly secured on said valve-stem, an annular valve surface around the lower end of said valve-body, a valve-cover slidably mounted on said valve-stem above said valve-body, a depending annular flange on said cover telescopically mounted upon the upper end of said valve-body, and an annular valve-surface around the lower edge thereof, substantially as and for the purpose set forth.

4. In a double-seat engine valve, a valve-stem, a valve-body rigidly secured thereon, guides depending from the lower end of said valve-body, an annular valve surface around the lower end of said valve body, a valve-cover having openings in the top thereof and provided with a limited movement on said valve-stem, an annular depending valve ring on said cover telescopically mounted on the upper end of said valve-body, and an annular valve surface around the lower edge of said valve-ring, substantially as and for the purpose set forth.

5. In an engine a flattened hollow casing adapted to be removably secured against the side of the cylinder within the steam-chest so that the cavity therein communicates with the cylinder ports, and having valve-seats in the flattened sides thereof communicating with cavity in said casing, substantially as set forth.

6. In a steam engine a hollow valve casing having a valve-seat opening in one wall thereof and an annular valve-seat upon the interior surface of the opposite wall thereof, adapted to be removably secured to an engine cylinder within the steam-chest so as to cover and communicating with the ports of the engine-cylinder, substantially as set forth.

7. In an engine a flattened hollow casing adapted to be bolted against the side of the cylinder within the steam-chest so that the cavity therein will communicate with the cylinder parts, and having valve-seat openings in the opposite flattened walls thereof, substantially as set forth.

8. In an engine-valve mechanism, an engine cylinder having port openings, a flattened hollow casing adapted to be bolted on the side of said cylinder within the steam-chest so that the cavity therein will communicate with a cylinder port, valve seats on the flattened sides thereof, and a valve adapted to seat down upon both of said seats substantially as set forth.

9. The combination in an engine-valve mechanism of a flattened hollow casing adapted to be removably secured to an engine cylinder within the steam-chest so that the cavity therein will communicate with a cylinder port, valve-seat openings in the opposite flattened walls thereof, and a double-seat valve adapted to seat down upon each of said valve-seat openings, substantially as set forth.

10. The combination in an engine-valve mechanism of two or more valve-seats arranged on an axial line vertically transverse to a radius of the engine cylinder, a valve-stem, one or more double-seat valves mounted in tandem upon said valve-stem so as to seat down upon all of said valve-seats in unison, and mechanism on said valve-stem between the valves thereon adapted to compensate for expansion and contraction in the coöperative parts of said valve mechanism, substantially as set forth.

11. The combination in a steam engine valve mechanism of a series of pairs of valve-seats arranged on the same axial line, a valve-stem, two or more double-seat valves mounted in tandem on said valve-stem and adapted to seat down upon each pair of said valve seats, one of said valves being rigidly secured to said valve-stem, and the rest of said valves having longitudinal movement on said valve-stem, a spring on said valve-stem, and means on said valve-stem adapted to press said spring against the movable valve on said valve-stem, substantially as set forth.

12. The combination in a steam engine valve mechanism of a series of valve-seats arranged in pairs on the same axial line, a valve stem, a valve-body rigidly secured on said valve-stem, an annular valve surface on the lower end thereof adapted to seat down upon the lower end of one pair of said valve-seats, an annular valve-ring telescopically mounted on the upper end of said valve-body, an annular valve surface on the lower edge of said valve-ring adapted to seat down upon the upper one of said pair of valve-seats, a stop on said valve stem above said valve-body adapted to limit the movement of said valve-ring on said valve-body, another valve-body slidably mounted on said valve-stem, an annular valve surface around the lower end of said slidable valve-body adapted to seat down upon the lower one of another pair of valve-seats, means on said valve-stem to limit the movement of said slidable valve-body thereon, a sleeve on said valve-stem above said slidable valve-body, a valve-ring telescopically mounted on the upper end of said slidable valve-body adapted to seat down upon the upper one of said second pair of valve-seats, means on said sleeve adapted to limit the movement of said valve-ring on said valve-body, a spring on said valve-stem, means on said valve-stem adapted to press said spring against said sleeve, substantially as and for the purpose set forth.

13. In a double seat valve the combination of a valve-stem, a valve body fixed thereon and having a seating-surface around one end thereof, and a valve cover slidably mounted on said stem and having a flange telescopically mounted on the other end of said body, said flange having a seating surface around the same.

14. In a double seat valve, the combination of a valve body having a seating-surface at one end thereof, and a valve cover on the other end of said body, said cover having a seating-surface, and also having openings to admit pressure to the valve body.

15. In a double seat valve, the combination of a valve body having a seating-surface at one end thereof and a valve cover on the other end of said body, said cover having a seating-surface, and also having openings to admit pressure to the valve body, said cover having limited movement with respect to said body, to permit variations in distance between the seating-surfaces.

16. A double seat valve comprising two seating-parts relatively movable to compensate for expansion or contraction, both of said parts being exposed to pressure in the same direction tending to keep the same seated.

17. The combination with a double-ported valve casing, of a double seat valve comprising two seating parts relatively movable to compensate for expansion or contraction, one of said parts having a seating-surface coöperating with one part of the casing and having a pressure surface of greater area than said part, and the other part having a seating-surface coöperating with the other port and also having an opening to admit pressure to said pressure surface of the first mentioned part.

18. The combination with a double-ported valve casing, of a double seat valve comprising a body controlling one port and having a pressure surface exposed at the other port, and a cover mounted on said body, said cover controlling said other port and having an opening to admit pressure to said body.

19. The combination with a valve casing having double ports of different areas, of a double seat valve comprising two parts relatively movable to compensate for expansion or contraction, one of said parts controlling the smaller port and having a pressure surface exposed at the larger port and of greater area than the smaller port, whereby the pressure tends to hold said part seated and the other of said parts controlling said larger port.

20. In an engine valve mechanism, the combination with a plurality of multiple valve seats, of a valve stem, a plurality of multiple-seat valves mounted on said stem and coöperating with said seats, and means to compensate for expansion or contraction, in the coöpeative parts of said mechanism.

21. In an engine valve mechanism, the combination with a plurality of multiple valve seats, of a valve stem, and a plurality of multiple-seat valves mounted on said stem, and coöperating with said seats, one of said valves being movable relative to the other, to compensate for expansion or contraction.

22. In an engine valve mechanism, the combination with a plurality of multiple valve seats, of a valve stem, a plurality of multiple-seat valves mounted on said stem and coöperating with said seats, said valves being relatively movable to compensate for expansion or contraction, and each valve comprising two parts also relatively movable to compensate for expansion or contraction.

23. A double seat valve of the hollow spool type, comprising two seating parts with a peripheral joint therebetween permitting relative movement of said parts.

24. A double seat valve of the spool type, comprising a recessed body having a seating-surface around one end thereof, and a cover having limited movement on the other end of said body, said cover having openings to admit fluid to the interior of said body.

In testimony whereof I affix my signature in the presence of two witnesses.

LE GRAND SKINNER.

Witnesses:

A. D. SKINNER,

GEO. E. TEW.

Copies of this patent may be obtained for five cents each, by addressing the "Commissioner of Patents, Washington, D. C."